United States Patent

Alouisa

[15] 3,705,523

[45] Dec. 12, 1972

[54] HYBRID ROUTING TECHNIQUE FOR SWITCHING COMMUNICATION NETWORK

[72] Inventor: Frank B. Alouisa, Neptune, N.J.

[73] Assignee: The United States of America as represented by the Secretary of the Army

[22] Filed: Sept. 21, 1970

[21] Appl. No.: 73,919

[52] U.S. Cl. ............................................179/18 EA
[51] Int. Cl. ..............................................H04q 3/56
[58] Field of Search ..................................179/18 EA

[56] References Cited

UNITED STATES PATENTS

| | | | |
|---|---|---|---|
| 3,377,431 | 4/1968 | Wright et al. | 179/18 EA |
| 3,316,354 | 4/1967 | Svala | 179/18 EA |
| 3,411,140 | 11/1968 | Halina et al. | 179/18 EA |

*Primary Examiner*—Thomas W. Brown
*Attorney*—Harry M. Saragovitz, Edward J. Kelly, Herbert Berl and Daniel D. Sharp

[57] ABSTRACT

A hybrid routing technique for an analog or digital switching communication network containing several switching centers for contacting a called subscriber at a destination switching center whose location in the network need not be known to the calling subscriber and for providing a deterministic route back from the destination switching center to the originating switching center. The entire system is substantially simultaneously flooded once in parallel radial fashion with a flood signal of simple format containing information representing the calling switching center, the called subscriber and the time or origination of the call; local subscriber directories at each of the switching centers of the network are examined substantially simultaneously to determine which of the switching centers is the destination switching center. The selection of a route between the called and the calling subscribers is done independently of the locating of the called subscriber and allows effective selection of routes, based on an abundance of information available at the switching centers concerning the current status of the network and regardless of transmission delays along the routes.

28 Claims, 14 Drawing Figures

INVENTOR,
FRANK B. ALOUISA

BY: Daniel D. Sharp, Harry M. Saragovitz, Edward J. Kelly & Herbert Berl
ATTORNEYS INVENTOR,
FRANK B. ALOUISA
BY: Daniel D. Sharp, Harry M. Saragovitz, Edward J. Kelly & Herbert Berl
ATTORNEYS INVENTOR,
FRANK B. ALOUISA
BY: Daniel D. Sharp, Harry M. Saragovitz, Edward J. Kelly & Herbert Berl
ATTORNEYS

INVENTOR,
FRANK B. ALOUISA

BY: Daniel D Sharp, Harry M. Saragovitz, Edward J. Kelly & Herbert Berl
ATTORNEYS

PATENTED DEC 12 1972 3,705,523

INVENTOR,
FRANK B. ALOUISA

BY: Daniel D. Sharp,
Harry M. Saragovitz,
Edward J. Kelly &
Herbert Berl
ATTORNEYS

HYBRID ROUTING TECHNIQUE FOR SWITCHING COMMUNICATION NETWORK

A proper routing technique is essential to all switching communication networks for interconnecting telephone, teletype, facsimile or other data subscribers and involves not only finding the called subscriber in the network but also interconnecting the called and calling subscribers through appropriate ones of the network switching centers.

Automatic routing systems for telephone subscribers have recently been developed which use the technique sometimes referred to alternatively as saturation signalling, non-deterministic routing or pure search routing. In such a system the address of a called party is propagated on one path in every available direction from each network switching center and the process is repeated at tandem switching centers until the destination (called) switching center is reached. The available route which requires the least amount of connection time is automatically selected for routing the call between the called subscriber and calling subscriber. When the destination switching center is reached, a connecting path is locked in by a revertive signal which progresses back toward the originating switching center. The called switching center can be reached without the calling subscriber having any knowledge of the location in the network of the called switching center.

Examples of such a system are shown in the Jacobaeus et al. U.S. Pat. No. 3,111,559 issued Nov. 19, 1963 and the Svala U.S. Pat. No. 3,316,354, issued Apr. 25, 1967. The telephone switching systems of these two patents use in-band signalling, that is, the same trunks are used for various control signals as are used for actual messages. A calling exchange includes a sender which sends a calling signal indicating the telephone number of the called switching center, as well as switching means connecting the sender with one idle outgoing trunk leading to adjacent switching centers. If the calling signal does not correspond to a number within the particular switching center, a marker sets the switching means connected with the sender for routing the signal along alternate routes, that is, routes other than the one by which the calling signal was sent out. The call thus is sent on to other switching centers in the network. If the calling signal corresponds to the number of a subscriber connected to the switching center, the latter sends back a revertive signal to the calling switching center in response to the calling signal, thus releasing all channels or routes which are being used as a connection between switching centers. This method of searching loads the in-band trunks or channels with search messages until such time as the called subscriber's switching center is located. Such a routing scheme requires large means for storing information since every one of the switching centers must hold the search information while search for the called subscriber progresses sequentially through the network. This scheme, which involves the process of timing of arriving signals, also has limited capability for selection of routes on a "least cost" basis or for the effective use of routes with long transmission delays, such as satellite links and remote radio station subscribers. With this scheme, route selection is limited to the shortest route regardless of quality. Finally, with this scheme, which is non-deterministic by nature, it is relatively difficult to provide overall system control for efficient tactical operation. System control, as used here, means those control functions of a total communications system which are important in increasing the efficiency of the routing system under actual operating conditions, such as by instituting route length limiting.

In prior real time or deterministic routing schemes, the originating switching center has complete control over the selection of a path between the calling subscriber and the called subscriber and is based on a network-wide directory. The path is selected from a prestored route table which contains one or more routes to be used for various switching center pairs. These routes are supplied either by the system controller or created automatically by a computer at each switching center. Real time routing is accomplished by an arrangement whereby routes are selected at switching centers based on complete information being available, such as network configuration, traffic loading on the trunks between switching centers and network outages.

In military operation, the purely real time routing scheme, which requires a complete subscriber location directory at all or most of the switching centers of the network, often is unsatisfactory. Subscribers may be moving about almost continuously and news of each such movement must be communicated, often through enemy lines, to all or most stations in the network. The updating of traffic required to maintain such a mobile directory, wherein the several subscribers at each switching center must all be made known to all other subscribers, can place a severe burden on the system.

In contrast, although applicant's non-deterministic system requires some knowledge of the complete system, such as network conductivity and the sending station, and since the network is flooded to reach the location of the called subscriber, applicant's network does not require an elaborate up-dated, system-wide directory of all subscribers. The switching centers in applicant's system are not required to store information relating to the location of all subscribers in the network, but just the small number of local subscribers.

In applicant's scheme, furthermore, selection of the route between the calling and the called subscribers is accomplished in a separate step from the step for locating the called subscriber. This selection of a path for communication is done by means of real time routing procedures with the inherent advantages, already mentioned, of capability of route selection on a "least cost" basis or for effective use of such often valuable routes as satellites and other remote radio links which may have comparatively long transmission delays. A least cost basis for route selection considers such factors as traffic loading of links making up the route, freedom from interference and noise which also may produce errors in transmission, the type of transmission, such as satellite or radio relay, and such factors as avoidance of destructive forces or influences. The present system is much easier to control, since the route selection process is basically deterministic, which by its nature has available an abundance of information at switching centers concerning the actual up-to-date status of the system.

Unlike the previous saturation signal routing systems, applicant's system floods the entire network substantially simultaneously with out-of-band flood (search) signals and provides a search-in-progress memory at each switching center in which an entry is made upon first receipt of an out-of-band flood signal. After sending an acknowledge signal back to the sending switching center, the flood signal then is propagated to all adjacent switching centers except the one from which the flood signal was received. When a given switching center has received acknowledge signals on all of its outgoing flood links to adjacent switching centers, the previous entry of the flood signal is erased from the search-in-progress memory of that switching center, thus relieving the burden on the latter. The search-in-progress memory in applicant's system, in other words, can be of much smaller capacity than the memory means used in the prior saturation signalling systems.

In applicant's system of simultaneous complete flooding of the entire network with flood signals, the technique of the invention does not really involve searching for the called subscriber in the same sense as with the previous saturation signalling (pure search signal) system. In the pure search system, a given switching center sends out search signals to all neighboring switching centers and a search is made at these neighboring switching centers for the called subscriber; if the latter is at one of these switching centers, further propagation of search signals from these switching centers to their neighboring switching centers is stopped. In other words, only after it has been determined that the called party is not at one of these switching centers is the search signal or message sent onto the next group of adjoining switching centers. This technique of the prior art is an in-band sequential search technique, and during each sequence of sending forward search signals to adjoining switching centers, message channels over which these search signals already have been propagated are held up until the switching center at which the called subscriber is located finally is included in the group of switching centers receiving a search signal. Assume, for example, a network of switching centers A to Z and that the calling subscriber is at switching center A and that the called subscriber is at switching center M. Switching center A sends a search signal to its neighboring switching centers, which, for example, may be switching centers B and C. If, after examination of switching centers B and C the called subscriber is not found there, switching center B sends a search signal to neighboring switching centers, for example, switching centers D, E and F, while switching center C similarly sends a search signal onto its neighboring switching centers, such as G and H. Assume further that switching center G sends a search signal on to neighboring switching centers I and J while switching center H sends forward a search signal to switching centers K, L and M. Now that the called switching center M has been discovered to be the location of the called subscriber, no further signal is sent forward to the remaining centers N to Z of the network. The time required to search the local subscriber memories of each switching center, which may contain several hundred subscribers, contributes greatly to the time taken to propagate search signals over a given channel between adjacent switching centers. With applicant's system, switching center A sends an out-of-band flood (search) signal to switching centers B and C, in the example given above and, if scanning of the relatively small capacity search-in-progress memory at switching centers B and C do not reveal previous receipt of a flood signal thereat, the flood signal is forwarded almost immediately by switching center B to neighboring switching centers D, E and F, and by switching center C and its adjacent switching centers G and H. This process is repeated throughout the network. Since the search-in-progress memory is much smaller than the local subscriber memory, the time taken to propagate a flood signal to the adjoining switching center or centers is much less than with the prior search systems. Much less time is consumed for each propagation of the flood signal between adjoining switching centers, and the propagation of such flood signals is delayed only long enough to permit entry into storage of the received flood signal. Furthermore, since out-of-band channels are used for propagation of the flood signals, message links necessary for actual voice or data communication are not held up during the flooding procedure.

Applicant already has investigated the possibility of converting a search routing system, such as shown in the prior art, from an in-band system to an out-of-band system. If, however, such a search routing scheme were operated out of band, a procedure known as "oversell" would be highly advantageous in order to provide efficient system operation. This procedure refers to the propagation of more flood signals over the out-of-band channel(s) of a link between adjacent switching centers then there are message channels or trunks in that link. If the oversell is too small, the chances are that too many network links will be full so that flood signals cannot proceed over these links; this results in less routes being available for message path connection. One must be careful to analyze the system so that the oversell is not too large or there will be insufficient channels or trunks to handle the selected message path connection. If a search routing scheme were to use out-of-band signalling between nodes, it would be difficult to determine the proper amount of oversell of search messages to send out of a particular node for the purpose of locating the called subscriber. Thus, when the "lock-in" for various calls (that is, the signal used to make the message connection between the now-located called subscriber and the calling subscriber) returns to a given switching center, some of these lock-ins, and thus the call connection attempts, may have to be dropped since not enough message channels may be available at that instant to satisfy the number of incoming lock-ins. Consequently, an undesirable loss of call attempts owing to unsatisfied lock-ins occurs and too many calls may have to be dropped in the network.

It should be noted that the prior patents do not involve oversell and consequently unsatisfied lock-ins since, with in-band signalling, the trunk or channel is always available if the signalling message gets through. However, for many networks, such as military communications systems, in-band signalling is much too inefficient. A lock-in signal is used in the Svala patent, but since in-band signalling is used, the lock-in is always satisfied, viz, a message channel is always available to make a connection. The routing system of the invention does not use the same search process as the prior patents for finding the called subscriber, as well as for connecting the called and calling subscriber, and thus lock-in channels are not used. Furthermore, oversell is not needed since a real time interconnecting procedure is used instead of lock-in procedures.

A summary of the remarks previously made in connection with the advantages of the invention contrasted with prior routing systems will now be set forth.

The hybrid routing system is not simply a combination of two previously known routing methods, but is a combination of highly modified methods, which, if used independently, would not be an efficient – or even a sufficient — means of routing. In the case of the procedure which is used to contact the called party's switching center (node), a method of flooding is used which would be highly inefficient if used alone. Note that flooding is not used in the Svala patent or any known routing method. The reason for this is that flooding is not very efficient in search routing arrangements, since the entire network is covered by each attempted call and information would have to be held at each switching center in the network for route selection purposes. This would result in large search-in-progress memories at each node, and loss of calls due to unsatisfied "lock-ins" during the backwards route selection process.

One advantage of out-of-band signalling over in-band signalling is the prevention of the generation of false signalling by the voice or data messages that are transmitted over the same path as the signalling messages. For example, the "on-hook" signal could be generated by a subscriber's voice message if the frequency of the voice happened to coincide with the frequency of the "on-hook" signal, thus disconnecting the path before the desired conversation is completed.

In the case of the real time (deterministic) routing arrangement, the problem of locating the called subscriber is a difficult problem to solve. Normally, a complex means must be used which involves the constant circulation of information throughout the entire network to inform all nodes of where other subscribers are located. For a system involving mobile radio subscribers, the problem is very severe. A key feature in the present invention which overcomes this problem is the devising of a simple means to contact subscribers without requiring the circulation of a continuous amount of information. This addition to or modification of the real-time system is superior to any other known combination of conventional search procedures with the real-time procedure. Other conventional combinations would result in too much equipment required at each switching center and highly inefficient traffic handling capability.

The hybrid routing technique of the invention involves a novel combination of a new method of contacting a called subscriber in a network wherein the location of the called subscriber is not necessarily known by the calling subscriber or cannot be obtained by consulting a directory and a new method using deterministic or real-time routing in route selection which also combines in a superior manner with the method of contacting the called subscriber.

The new method of contacting the called subscriber includes the following features:

a. A flooding procedure has been devised wherein the flooding is handled in a very fast manner and is not done sequentially, as in the Svala patent (which loads down the network with search traffic). Flooding is done in a parallel radial fashion and all local memories at each switching center in the network are more or less examined at the same time. Since local memory scanning can be relatively time consuming, the simultaneous flooding feature, instead of a sequential searching, provides minimal loading of the network.

b. The flood signals used in the flooding procedure have a simple format adapted to both analog or digital switching networks and containing essentially the address of a called subscriber, the address of a calling switching center and the time of call origination.

c. A procedure has been set up for preventing more than one connection to a called party which uses the time of origination tag in the flood signal.

d. A simplified procedure has been set up for designating the calling source by using the portion of the flood signal indicating the address of the calling switching center.

e. A method of time-out and simple rules has been devised to permit flooding to cover the network only once, thereby reducing the signalling requirements to a minimum and preventing the undesirable ring-around-the-rosy problem. Other search routing methods require complex rules and elaborate switching equipment to accomplish this purpose.

f. A procedure has been devised using out-of-band signalling techniques whereby the effects caused by satellite delays are circumvented.

g. An out-of-band queueing and simple signalling procedure has been devised such that assurance is given that the called subscriber is always reached regardless of the traffic loading in the network.

h. A procedure has been set up wherein all signals, such as flood signals and acknowledge signals are propagated out of band, that is, over channels or trunks which are not used for messages.

A new method of route selection involves the following novel concepts:

a. Routing from the called switching center to the calling switching center is backward.

b. The same out-of-band channels for route selection are used as were used for flooding to provide for efficient overall signalling.

c. The calling switching center is addressed from the previous flooding procedure and facilitates route selection by supplying information concerning the calling switching center rather than the calling subscriber.

d. Cancellation of one call by another call to the same address is prevented by storage of information at the calling and called switching centers.

The invention also involves the novel integration of the called subscriber contacting procedure and the route selection procedure.

FIG. 1 is a diagram illustrating a typical switching communication system comprising several interconnected switching centers;

FIGS. 2*a* and 2*b* are flow charts describing operation of the novel method of locating a called subscriber in the network of FIG. 1;

FIGS. 2*c* and 2*d* are flow charts describing operation of the novel method of path or route selection between the destination switching center and the originating or calling switching center;

Figures 1, 2A:
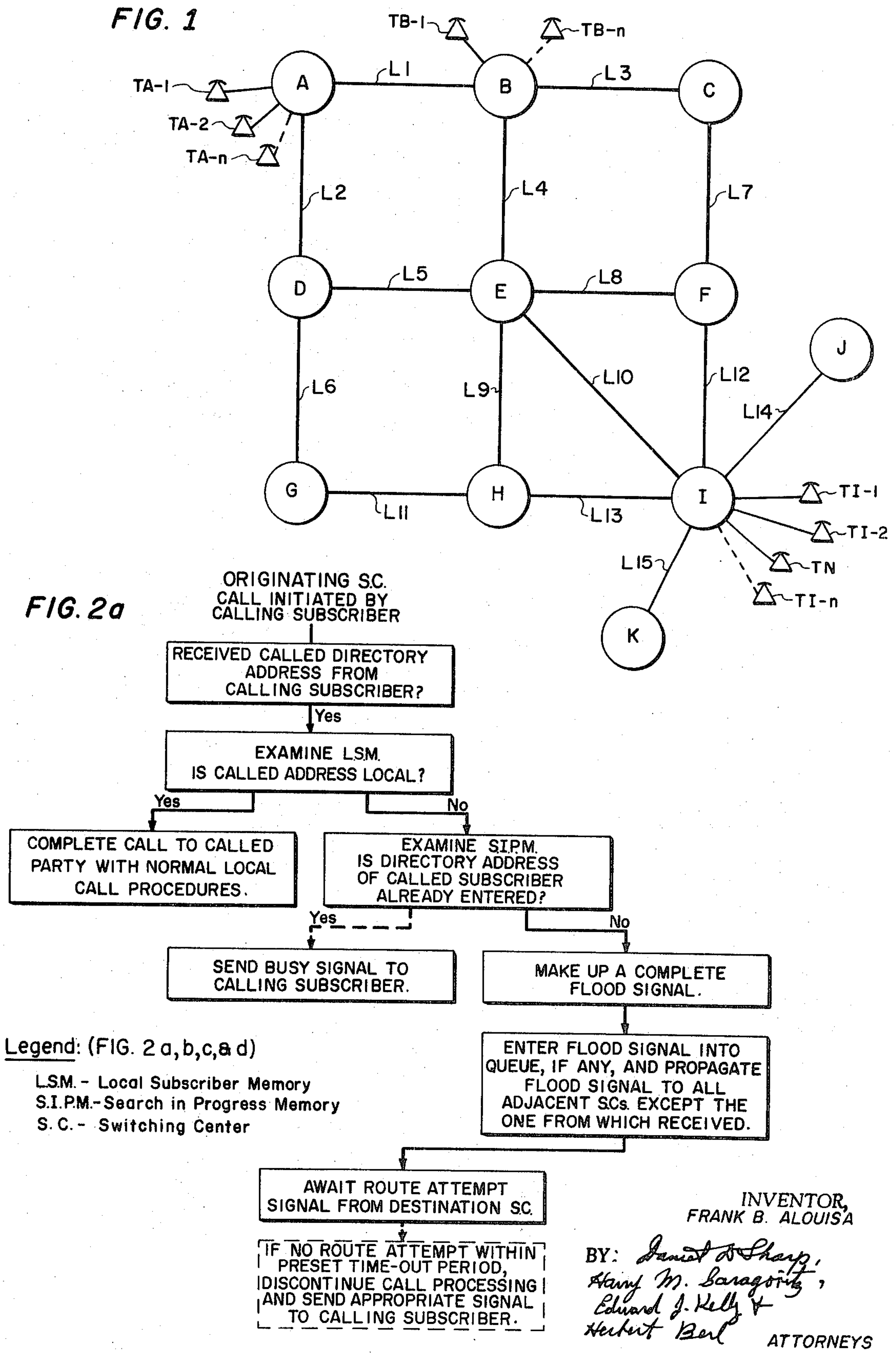

FIGS. *5a* to *5g* are simplified diagrams illustrating steps involved in the procedure for locating a called subscriber in the network of FIG. 1.

Referring now to the drawings, flow charts describing the hybrid routing technique of the invention are shown in FIGS. *2a*, *2b*, *2c* and *2d*. These charts are based on one switching center of a network such as illustrated in FIG. 1, in which switching center A is assumed to be the originating switching center to which the calling subscriber TA–1 is connected and switching center I is assumed to be the destination or called switching center at which the called subscriber TN is situated. The chart of FIG. *2a* is for an originating switching center, the chart of FIG. *2b* is for switching centers other than the originating and destination switching centers, the chart of FIG. *2c* is for a destination switching center only and the chart of FIG. *2d* is for all switching centers other than the destination switching center. Each chart represents the procedure for any switching center in the network, subject to the foregoing restrictions, and will be referred to here generically as either XSC, YSC or ZSC.

A program for a locally originated call is shown in FIG. *2a*. When the calling subscriber TA–1 dials the address of the called subscriber TN, this address of TN is entered into the processor of the originating switching center. If XSC is the originating switching center (viz, switching center A in FIG. 1) the local subscriber memory at XSC is examined to determine if the called address is local. If so, the call is completed using normal local call procedures. The local subscriber memory is an updated storage means or directory at each switching center which contains the addresses of all subscribers which are currently connected to that switching center. Obviously, if the called address is local, no routing procedure need be established.

If the called address is not local, a routing procedure is initiated, as indicated in FIG. *2a*. The first step in this procedure is to examine the search-in-progress memory at switching center XSC to determine whether another local subscriber at the originating switching center has already called the same subscriber. If so, a busy signal is sent to the later-calling subscriber TN. If not, a flood signal is made up at the originating switching center which contains, in addition to the address of the called subscriber TN, the address of the calling switching center A and a time of identification tag for the call. The flood signal generated at the originating switching center in response to the dialing of the called subscriber at some instant of time then is propagated to all adjacent switching centers until an acknowledge signal is received from all said adjacent switching centers. Until such acknowledge signals are received, the switching center periodically propagates the flood signal. The acknowledge signal is transmitted by any one of the switching centers and may be of a different character than the flood signal; this acknowledge signal informs the originating switching center that its flood signal has been received, thereby preventing an erroneous indication to the calling subscriber TA–1 that his call to TN cannot get through the network. It should be noted, in this connection, that there is a time-out signal initiated at each switching center except the destination switching center for each link leading therefrom for discontinuing processing of signals on that link if the acknowledge signal is not received back within a preset period of time to cancel this time-out signal; the time interval is somewhat greater than that necessary for propagation of signals between adjoining switching centers. Another purpose of the acknowledge signal is to erase the entry into a search-in-progress memory, at a given switching center when acknowledge signals are received over all outgoing links leading from that switching center.

At about the same time that the flood signal is propagated to adjacent switching centers, this flood signal, already stored in the switching center, is entered into the search-in-progress memory at that switching center. The function of this search-in-progress memory at each switching center is to store temporarily either the flood signal made up by the originating switching center, in the case of the originating switching center, or the flood signal previously received from an adjoining switching center, in the case of switching centers other than the originating switching center. Primarily, the search-in-progress memory searches to inform a given switching center whether or not the same flood signal as that now arriving has already been received by this switching center over a different link from some other switching center which earlier had propagated the identical flood signal. The switching center XSC now awaits the arrival of a route attempt signal from the destination switching center. The route attempt signal will be described later in some detail.

The routing procedure followed at a non-originating or intermediate switching center, that is, the procedure for a call which is not locally originated, is illustrated in the flow chart of FIG. *2b*. The first step in the routing procedure at other than the originating switching center is to determine whether the signal being received is a flood signal or an acknowledge signal. If the incoming signal to switching center XSC is a flood signal and if switching center XSC receiving this flood signal is not the calling switching center, the search-in-progress memory in switching center XSC is examined or scanned to determine whether or not the same flood signal has previously been received by switching center XSC by way of a different link. If the same flood signal has been received previously, an acknowledge signal is sent back by XSC to the sending switching center and there is no more processing of this flood signal. In applications in which queueing is used to store flood signals to be propagated in the network prior to their actual forwarding to adjoining switching centers, the queue entry for the same call at the sending end of the incoming link of switching center XSC would be deleted. Moreover, the control unit of switching center XSC permits no further processing of the flood signal just received, thus preventing the ring-around-the-rosy problem, i.e., the continuous flooding of all or portions of the network. If an examination of the search-in-progress memory at switching center XSC reveals that no identical flood signal has been received, an acknowledge signal is sent by switching center XSC to the switching center from which the incoming flood signal was received. Then the flood signal is propagated to all switching centers adjoining switching center XSC except the one from which the incoming flood signal was received. The flood signal is also entered into the search-in-progress memory of switching center XSC. The local subscriber memory at switching center XSC now is scanned to determine if that portion of the flood signal representing the address of the called subscriber is in the local subscriber memory, that is, to determine whether or not the called subscriber is connected locally to switching center XSC. If so, a real-time routing procedure is initiated to establish a route back to the calling switching center.

If the incoming signal to the given switching center XSC is an acknowledge signal, it is then necessary to determine whether or not an acknowledge signal has been received by switching center XSC over all out-of-band flood links leading outwardly from this switching center. If so, the previous entry of the flood signal in the search-in-progress memory of switching center XSC is erased. If not, switching center XSC awaits additional incoming acknowledge signals from the links interconnecting it with other adjoining switching centers.

Figure 2B:
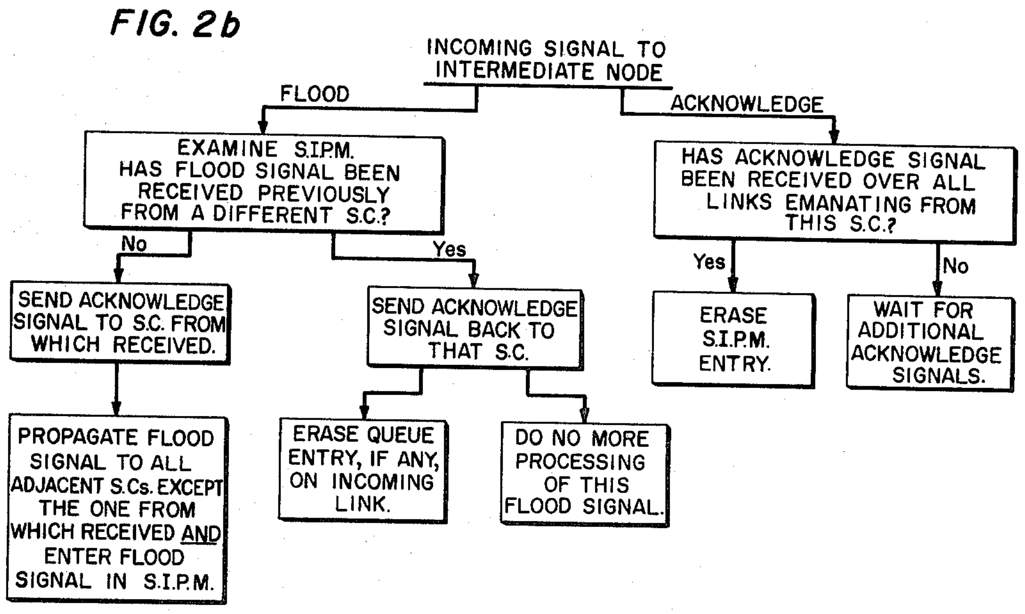
Figure 2C:
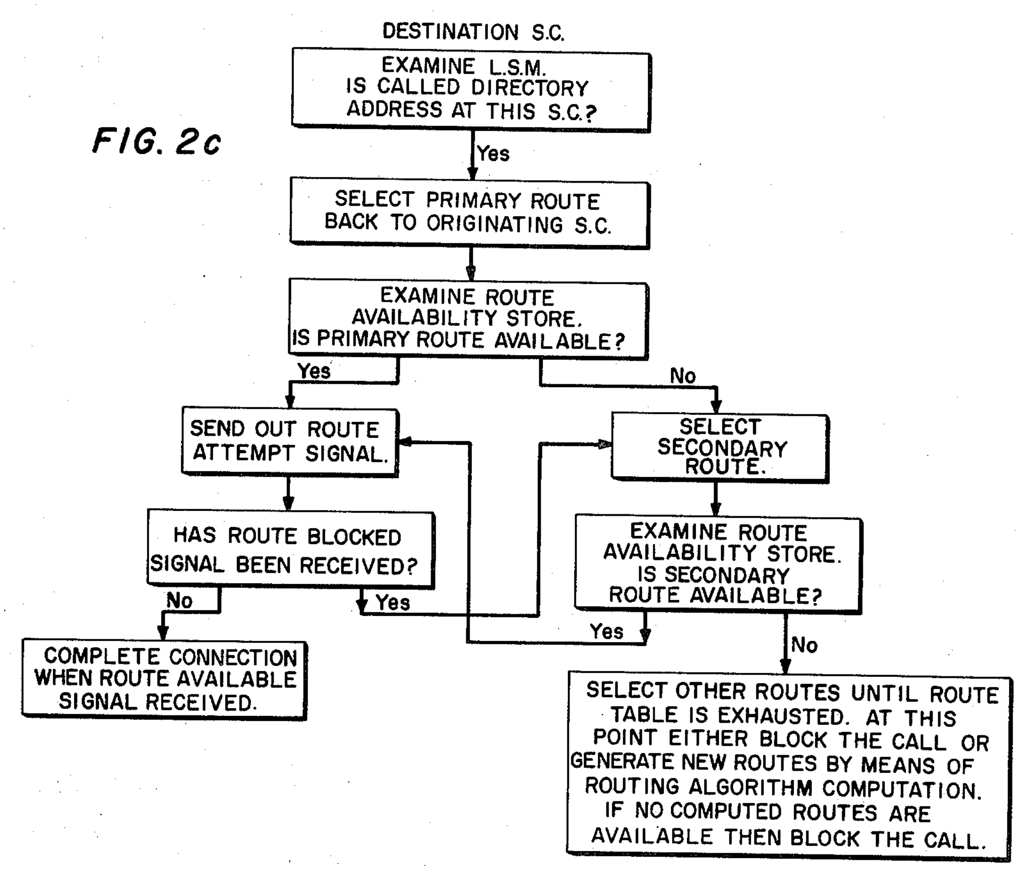
Figure 2D:
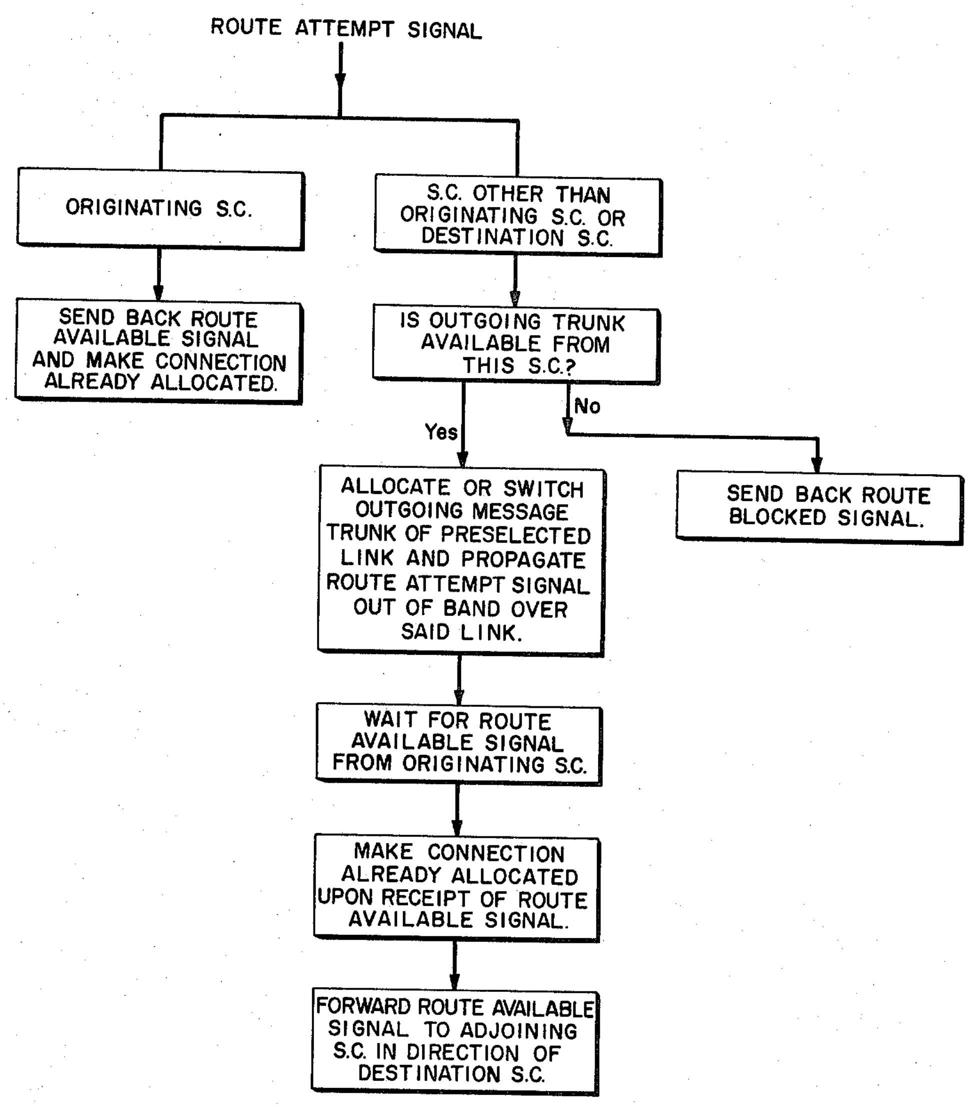

The real-time routing procedure is shown in the flow chart of FIGS. 2*c* and 2*d*. The chart of FIG. 2*c* represents a switching center which is the destination switching center, that is, a switching center at which the called subscriber is located, such as switching center I in FIG. 1. The chart of FIG. 2*d*, on the other hand, is for a switching center other than the destination or originating switching centers, such as switching centers B to H and J to K in FIG. 1.

The flow chart of FIG. 2*c* representing the procedures occurring at the destination switching center could be for any one of the switching centers in the network (actually switching center I in FIG. 1) and will be referred to here generally as switching center YSC. It should be understood that this is the same switching center as the switching center XSC referred to previously in connection with the chart of FIG. 2*b* as having the called party's address in its local memory.

The identity of the calling switching center is known from that portion of the flood signal indicating the calling switching center which has been stored in the search-in-progress memory at YSC. The first step is to select a primary route back to the originating center. Switching center YSC, along with all other switching centers, has stored therein several links of differing degrees of preference which represent appropriate means for interconnecting the given switching center YSC with any other switching center. The next step is to determine whether or not the primary route of these appropriate routes is available. This determination is made by comparing the information representing the various links making up a complete primary route between switching center YSC and the originating switching center with information representing such route availability in a constantly updated route availability store at that switching center YSC. If the primary route is not available, selection of an alternate or secondary route must be made and this route similarly checked for availability. If the secondary route also is not available, selection of other routes must be made, until all established selectable routes are exhausted. One either blocks the call or generates new routes by means of routing algorithm computation and, if still no acceptable routes are available, the call must be blocked. The destination switching center YSC now sends an all routes busy signal by way of an out-of-band (signalling) channel to the originating switching center A, using the shortest path, that indicates to switching center A that all routes are blocked. The originating switching center A then sends a special "all-trunks busy" signal to the calling subscriber TA–1.

As soon as a route is available, for example, the secondary route, a route attempt signal is propagated out of band from the destination switching center YSC; this route attempt signal contains a tag peculiarly identifying the signal as a route attempt signal and a code identifying the complete secondary route (combination of individual links) over which the call is to proceed between switching center YSC and the originating switching center. The route attempt signal from YSC is propagated along an out-of-band trunk or channel from YSC and a message connection is reserved between YSC and the adjoining switching center along the preselected route. Connection, of course, must be completed all along the preselected route until the originating switching center is reached. This route attempt signal finally reaches the calling switching center. A route available signal now is generated by the calling switching center in response to receipt by the calling switching center of this route attempt signal and is propagated along the reserved connections just described. When switching center YSC receives the route available signal from the calling switching center, the reserved connections are now completed, i.e., a connection of a message trunk (channel) from switching center YSC to the adjoining switching center in the direction of the calling switching center is made over the same link as the connection previously reserved.

Upon establishing a route between the destination switching center YSC and the originating switching center, the destination switching center now examines the status of the called subscriber, that is, a check is made as to whether or not the called subscriber TN at the destination switching center YSC is already busy with another call. If so, the destination switching center YSC sends a "called-party-busy" signal over the shortest route to the originating switching center and the latter relays this busy signal to the calling subscriber. If the called subscriber is not busy, a ringing signal is sent out from the destination switching center YSC to the originating switching center which the latter passes onto the calling subscriber.

Referring now to the flow chart of FIG. 2*d* for the intermediate switching centers, if a given intermediate switching center, herein referred to as ZSC, receives a route attempt signal and it is the calling or originating switching center, then a route available signal is sent back to the various switching centers along the selected route or path so that message connections can be made at the associated switching centers. If switching center ZSC receiving the route attempt signal is not the originating switching center, and at least one outgoing message trunk along the preselected route is available at this switching center, one of these message trunks is reserved and the route attempt signal is propagated toward the originating switching center.

If there is no outgoing available trunk along the preselected route, then a route blocked signal is sent back on the same trunk over which the route attempt signal had propagated. This blocked condition may arise since sudden change in the system can invalidate the previous information that the route preselected by the destination switching center was available.

If and when a route available signal arrives at the given switching center ZSC from the originating switching center the connection previously reserved is completed and switching center ZSC forwards the route available signal to the adjacent switching center to switching center ZSC in the direction away from the originating switching center.

Before proceeding with a more detailed description of system operation, a brief explanation of a typical trunk group or link such as used in the network of FIG. 1 will be given. The network drawing of FIG. 1 indicates but one line between each of the switching centers, according to normal practice. Actually, however, each of these lines in FIG. 1, such as the line designated as L1 interconnecting switching centers A and B, represents a trunk group or link between each pair of switching centers which link comprise several trunks or channels. Each of the trunks emanating from a switching center are four-wire trunks in most military applications, with each trunk consisting of a send pair and a receive pair, since the links normally are radio links requiring separate paths for transmission and reception of information. Two wires, as well as four wires, can be used for local loops between a switching center and local subscriber instruments.

Figure 3:
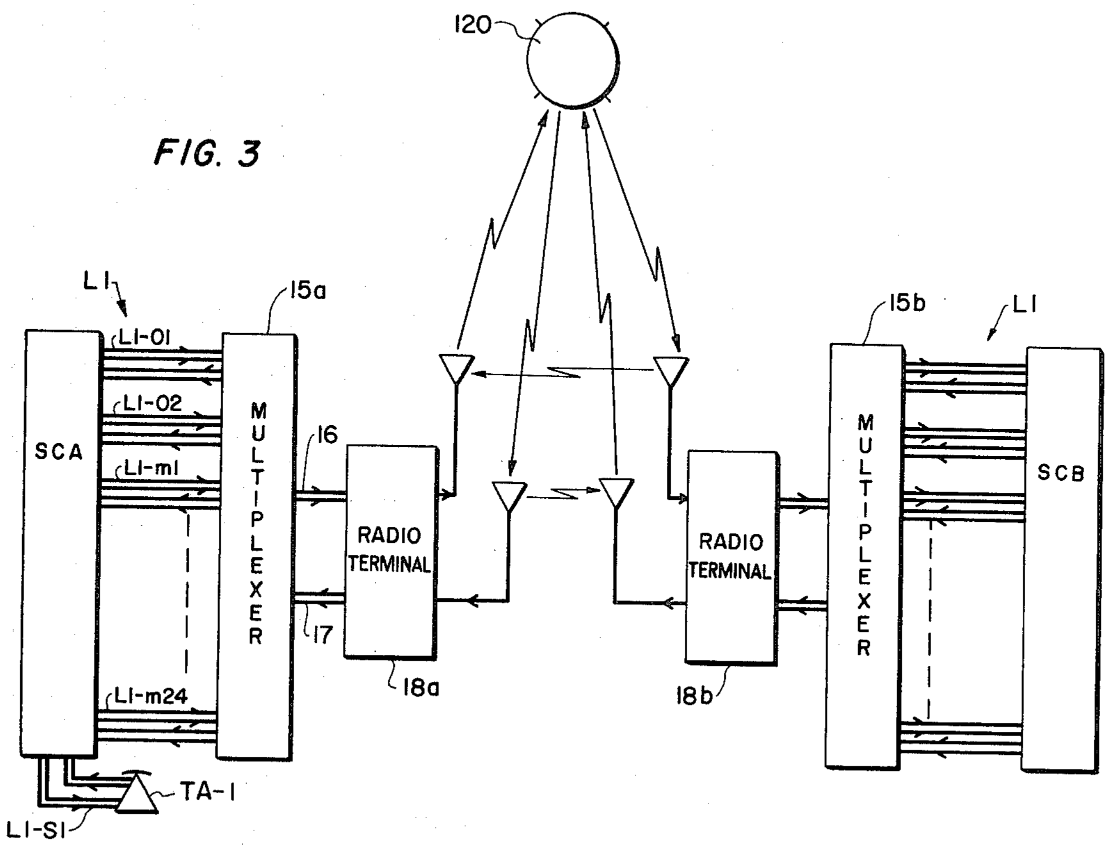
FIG. 3 is a diagram of a typical link between a pair of adjoining or interconnected switching centers.

A typical link is shown in FIG. 3 and illustrates a possible link L1 such as might be used to interconnect switching centers A and B of FIG. 1. The trunks from the switching center A which combine to form trunk group or link L1 may comprise, for example, two out-of-band signalling trunks L1–o1 and L1–o2 and 24 message trunks L1–ml to L1–m24, only two of which message trunks are shown in FIG. 3, for the sake of clarity. A plurality of local subscribers TA–1 to TA–*n* are connected to switching center A by way of local four wire lines L1–s1 to L1–s*n*. In less complex networks, it may be possible to forego multiplexing and to connect the aforesaid 26 trunks directly between switching centers A and B. However, such a wire link normally is too bulky and expensive so that multiplexers 15*a* and 15*b* are used in the path between adjacent switching centers A and B to reduce the number of wires required to four; these four wires may consist of a coaxial cable 16 for sending from switching center A (receiving at switching center B) and a coaxial cable 17 for sending from switching center B (receiving at switching center A). For a wire link, with multiplexing, cables 16 and 17 would directly interconnect multiplexers 15*a* and 15*b* at switching centers A and B, all respectively.

When a radio link is used, multiplexing is resorted to in order to avoid having to use a separate radio link for each of the four wire links; as indicated in FIG. 3, radio relays 18*a* and 18*b* could then be inserted in the path between switching centers A and B for amplifying the out of band and message signals, and, as shown in FIG. 3, a satellite 120 also could be used to relay both radiated and received signals.

With time division multiplex systems, each trunk or channel, whether out of band or message, actually is a time slot or channel and a single cable serves to propagate these channels in one direction. In such cases, it is more common to speak of channels, rather than trunks, although these terms may be used interchangeably. In the example given, there would be 24 channels in a trunk group or frame.

The four-wire trunks shown in FIG. 3 must have a bandwidth of about 4KHz to handle adequately voice messages and other signals incidental to normal telephone switching. For a frequency division system with 24 message channels and two out-of-band signalling channels, a bandwidth of (24 + 2)4 or 104KHz would be required. If the number of out-of-band signalling channels is increased from two to five, for example, then this 24 message channel system would require a bandwidth of (5 + 24)4 or 116KHz. More than one out-of-band trunk or channel may be required inasmuch as several out-of-band signals for different calls may need to be propagated from a given switching center at the same time. In other words, one must increase the bandwidth as a trade-off for an increase in the number of signals that can be handled simultaneously. In many systems, the bandwidth is reduced by reducing a number of out-of-band signalling channels to as few as one channel. In this case, a signalling queue may have to be established at each switching center on the outward or send pair of each given trunk or channel. This queue is a storage means wherein the various signals can await their turn for propagation. It should be understood, however, that queueing is not essential to the operation of the hybrid routing technique of the invention and is used only when it is necessary to conserve bandwidth by minimizing the number of out-of-band signalling channels. No queue is needed on the receive side of a trunk since storage means normally is provided in sufficient capacity at a given switching center to handle all incoming signals.

One should consider trunks as separate paths between switching centers. Within a given switching center, the two-way trunks (four wires) are handled always as one connection; for example, four cross-points or relays are operated at the same time to make a connection and are never handled in a separate or independent action. In this way, the send side of the telephone is connected always at the same time as the receive side in order to permit conversations to progress simultaneously in either direction.

Figure 4:
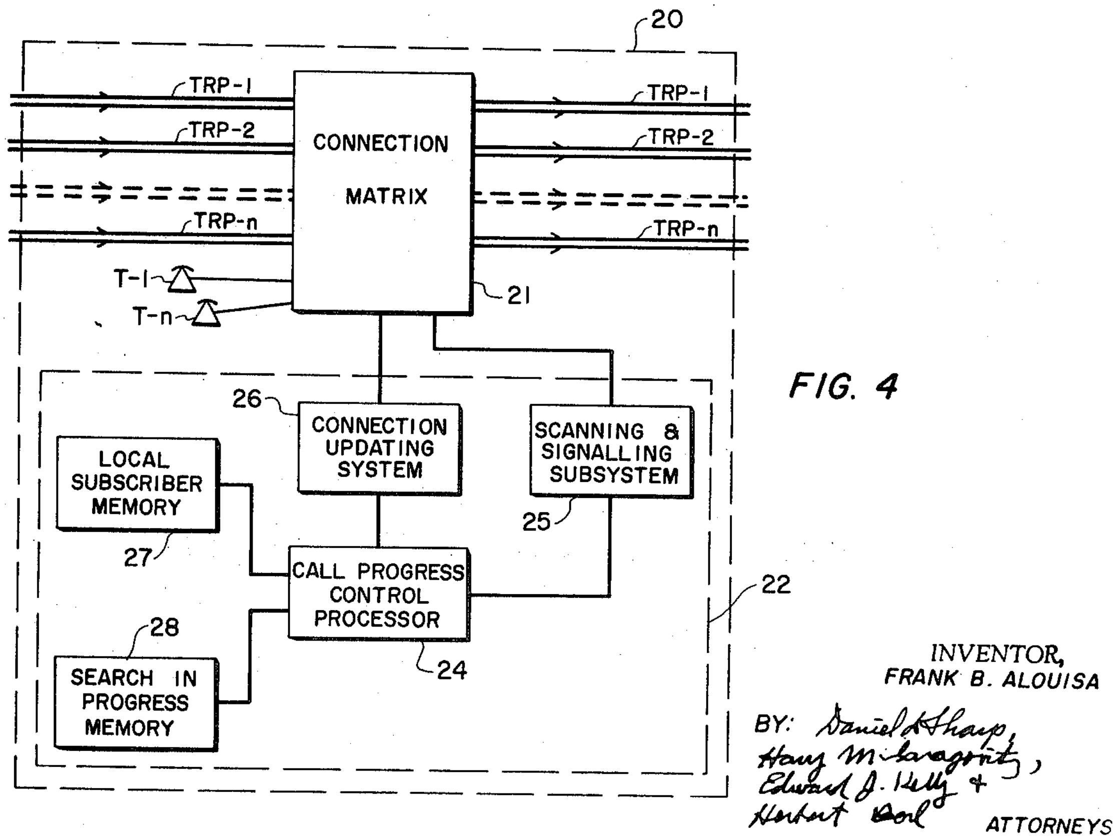
FIG. 4 is a functional block diagram of a typical switching center such as shown in FIG. 1.

A functional block diagram of a typical switching center of the network of FIG. 1 is illustrated in FIG. 4. The switching center 20 of FIG. 4 includes a connection matrix 21 and a control unit 22. The connection matrix 21 consists of a number of cross-points for making various connections between the many send are receive pairs TRP–1 to TRP–*n* constituting a given trunk group and the connections between local subscribers T–1 to T–*n* and these trunks. For example, if the switching center of FIG. 4 were the switching center B of FIG. 1, the connection matrix 21 of FIG. 4 would be connectable to the send and receive pairs of the trunks making up links or trunk groups L1, L3 and L4 for interconnecting switching center B with adjacent switching centers A, C and E, respectively, together with the various local subscribers TB–1 to TB–*n*.

The control unit 22 includes basically a call progress control processor 24 hereinafter referred to simply as a processor, a scanning and signalling subsystem 25, a connection updating system 26, a local subscriber memory 27 and a search-in-progress memory 28. It should be noted that the control unit 22 is shown functionally; that is, the functions performed by each of these components need not be physically separated components. By way of example, one or both of the memories, as well as the scanning and signalling subsystem, could be physically located within the processor; on the other hand, different portions of the processor might be located within other of the components of the control unit 22. The control unit 22 can be a computer in which case the processor would be central control unit and the memories programmed by the computer. On the other hand, a computer is not essential to the invention and a system of wired logic can be used, where, for example, information is retained or transferred by such circuit means as relays, comparators, and the like. In either case, the function of the processor 24 is to effect the necessary step-by-step procedure for servicing the call between subscribers. The function of the scanning and signalling subsystem 25 is to scan trunks to detect the presence of such incoming control signals as acknowledge signals, flood signals, route available signals and route blocked signals, as well as such other signals essential to a telephone system as off-hook signals, dial tones, etc. In some cases, the control signals are in the form of distinctive combinations of tones whereas the information and the processor and memory is digital in format; in such cases, the scanning and signalling subsystem also serves to perform the necessary analog-to-digital conversion operations. The scanning and signalling subsystem 25 also functions to generate or to propagate signals which may be stored in a buffer storage in the scanning and signalling subsystem itself during the scanning procedure or stored in the processor 24 and transferred by the latter to the scanning and signalling subsystem. There may be several scanning and signalling subsystems at a given switching center to handle calls which may be occurring concurrently. However, it is not necessary to use one of these scanning and signalling subsystems for each trunk, since they would be too expensive; usually, therefore, one scanning and signalling subsystem is used for a number of lines somewhat less than the total number of trunks.

The connection updating system 26 functions under control of the processor 24 to make or break the necessary cross-point connections in the switching matrix 11. Both the scanning and signalling subsystem 25 and the connection updating system 26 are always under the direct control of the processor. The functions of the search-in-progress memory 28 and the local subscriber memory 27 has been mentioned earlier in connection with the description of the flow charts of FIGS. 2*a* to 2*d*.

In describing the hybrid routing technique in detail, it will be assumed, for the sake of illustration, that a call is to be made from a calling subscriber TA-1 connected to an originating switching center A of the network of FIG. 1 to a called subscriber TN. When the called subscriber TA–1 at originating switching center A dials the address of the called subscriber TN, which address, for example, may be a three-digit code peculiar to that subscriber, this dialed address is supplied to the processor at switching center A.

It will first be assumed that the called subscriber TN is at the same location in the network as the calling subscriber TA–1, viz, at the originating switching center A. When the calling party TA–1 initiates a call to called subscriber TN by dialing the directory address of the subscriber TN, the switching center examines the local memory and, finding the called subscriber's address in the local memory, makes the local-to-local call connection between subscribers TA–1 and TN.

If the called subscriber TN is not at the originating switching center (as in the example illustrated in FIG. 1) determined by the examination of the local subscriber memory at switching center A, the search-in-progress memory at switching center A is examined to determine whether or not another local subscriber, for example, TA–2 has already called the same subscriber TN. If the dialed address of subscriber TN is already in the search-in-progress memory at switching center A, as determined by an examination of the search-in-progress memory, a busy signal is sent by the processor at switching center A to the local calling subscriber TA–1. If the calling subscriber TA–1 is the first subscriber at switching center A to call subscriber TN, a complete flood signal must be made up at switching center A which contains, in addition to the address of the called subscriber, the address of the calling switching center A and a code or tag designating the time of initiation of the call by the calling subscriber TA–1.

Figure 5A:
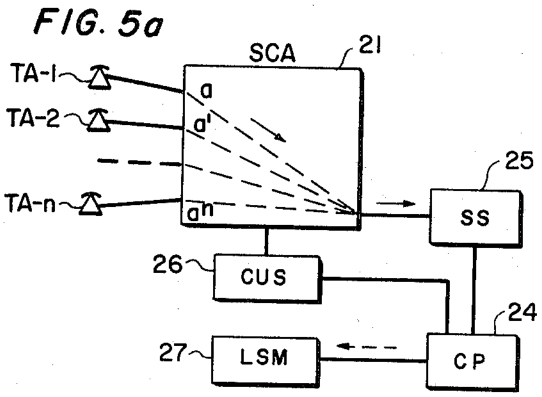

The directory code for the called subscriber TN dialed by the calling subscriber TA–1 is sent to the scanning and signalling subsystem at switching center A. As indicated in FIG. 5*a*, the scanner in the scanning and signalling subsystem in conjunction with the connection updating subsystem 26 sequentially makes the connections $a, a^1 \ldots a^n$ at the switching matrix 21 to the various local subscribers TA–1 to TA–*n*. The dialed address of the called subscriber TN from calling subscriber TA–1, traverses the path as shown by the solid arrow in FIG. 5*a* and is directed to the scanning and signalling subsystem 25. The called address is now stored in the temporary storage means in the scanning and signalling subsystem and is transferred to and stored in the processor 24. The connections $a, a^1$, etc., indicated by dashed lines in FIG. 5*a*, are out-of-band connections temporarily made, since the scanning portion of the scanning and signalling subsystem 25 of each switching center is scanning continuously either the local subscriber lines, in the case of the originating switching center A, or the various trunks to other switching centers, for dialed directory signals, flood signals, and other call signals, subject to the aforesaid temporary holding action to allow for processing of a sensed signal on one of the aforesaid lines or trunks, already described.

The processor then forwards the directory code (the called subscriber's address) to the local subscriber memory 27 at switching center A for comparison with the subscriber codes stored therein, as indicated by the dashed arrow in FIG. 5*a*. Since the called subscriber TN is not at switching center A, in the example given, examination of the local subscriber memory by the processor at switching center A does not reveal an address therein identical to that just entered into the processor by way of connection a and the scanning and signalling subsystem. In consequence, a distinctive signal or code is sent to the processor, as indicated by the solid arrow in FIG. 5*b*.

Figure 5B:
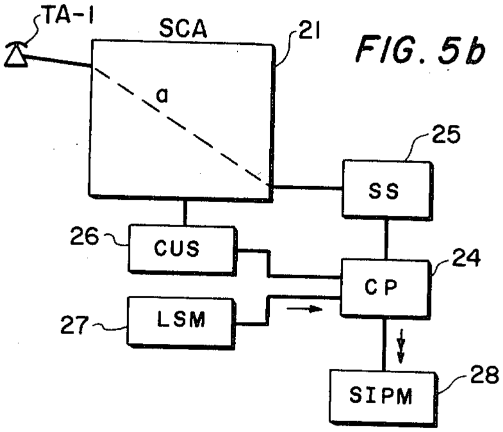

The processor, in response to this signal from the local subscriber memory 27, makes up a complete flood signal which is entered into the search-in-progress memory 28, as indicated by the double arrow in FIG. 5*b*. The flood signal includes the address of the called subscriber TN, the address of the calling switching center A and the time of origination identification tag. The purpose of the address of the originating switching center A is to hold a connection from switching center A and subscriber TA–1 while the called subscriber TN is being located and a message connection back to switching center A is being made. If this portion of the address is not stored in switching center A, there will be nothing at that switching center to inform the latter which subscriber at this switching center should be connected up to the called subscriber when the latter is located (note that the search-in-progress memory entry at switching center A will have been erased at the conclusion of the flooding process). The time of origination tag is necessary to take care of possible multiple calls from different subscribers to the same called subscriber TN. Although the flood signal essentially is a search signal which contains the address of the called subscriber, the address of the calling or originating switching center and the time of origination tag used to uniquely identify a particular call, other information could be included in the flood signal or message, if required, such as priority of the call, whether the call is voice or data, and so forth. Conventional telephone signals, such as request for service, dial tones, on-hook signals, and the like, also are required for proper operation of signalling and control functions between switching centers and are accomplished by the connection updating subsystem and the scanning and signalling subsystem under control of the processor.

Figure 5C:
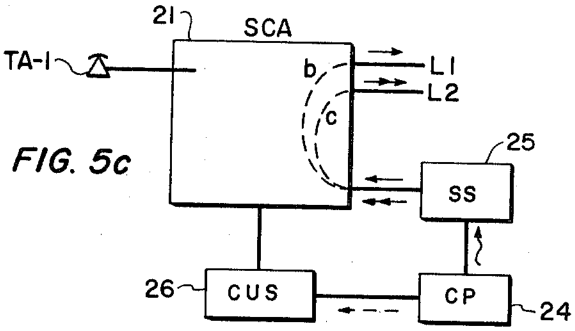

The processor 24 of switching center A now sends a command, indicated by the dashed arrow in FIG. 5*c*, to the connection updating subsystem 26 to break connection a and to make an out-of-band connection in the switching matrix, shown by the dashed line b in FIG. 5*c*, to an out-of-band-signalling channel or trunk of the outgoing trunk group L1, after which the processor sends an order (see wavy arrow of FIG. 5*c*) to the scanning and signalling subsystem 25 to propagate the flood signal, indicated by the solid arrow in FIG. 5*c*, over the out-of-band connection *b* and the available out-of-band channel or trunk of line L1 to adjoining switching center B. As soon as the flood signal has been propagated over connection *b* and link L1, the connection *b* must be broken by the connection updating subsystem 26 under command of the processor 24, since other calls may have to use the same out-of-band connection *b*. The processor 24 at switching center A now instructs the connection updating subsystem 26 (see wavy arrow in FIG. 5*c*) to make the out-of-band connection *c* in the switching matrix 21 for the subsequent propagation of the flood signal (see double-headed arrow of FIG. 5*c*) by the scanning and signalling subsystem 25, under command of the processor, to an out-of-band trunk in trunk group L2 leading to adjoining switching center D. As before, the connection *c* then is broken in order to free this connection for possible use for other calls. The connections *b* and *c* are shown in FIG. 5*c* as existing concurrently in order to avoid using separate figures.

In describing FIG. 5*b*, it was stated that the flood signal was entered into the search-in-progress memory at the originating switching center A; later, in describing FIG. 5*c*, the flood signal was stated to be propagated from switching center A of FIG. 5*a*. It is important that the flood signal be propagated to adjoining switching centers with a minimum of delay. It is not necessary to delay propagation of the flood signal pending entry of the flood signal into the search-in-progress memory, since the flood signal, upon arriving at the scanning and signalling subsystem of a given switching center, can be stored temporarily and practically instantaneously in the scanning and signalling subsystem and almost immediately in the processor, upon receipt over connection *a*.

Figure 5D:
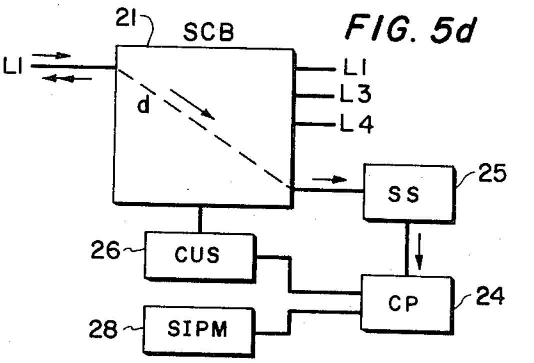

The flood signal propagated from switching center A now arrives at switching center B over trunk group L1 and at switching center D over trunk group L2. As shown in FIG. 5*d*, the scanning and signalling subsystem of switching center B picks up the flood signal from switching center A by way of path *d* in the switching matrix of switching center B and this flood signal, indicated in FIG. 5*d* by the heavy arrow, is stored in the scanning and signalling subsystem 25 and also is transferred into storage means located in the processor 24 at switching center B. Since switching center B is not the originating switching center, the processor now examines the search-in-progress memory 28 at switching center B to determine whether the same flood signal has already been stored. An acknowledge signal, indicated by the double arrow in FIG. 5*d*, is ordered by the processor to be sent out by the scanning and signalling subsystem 25 of switching center B, under control of its processor 24, over link L1 to switching center A from which the previous flood signal has been received. The acknowledge signal may be sent back to switching center A by an appropriate path in the switching matrix of switching center B which may be the same connection in the switching matrix of switching center B used in supplying the flood signal from switching center A to switching center B, as shown in FIG. 5*d*, or it may be a different connection. This acknowledge signal is picked up by the scanning and signalling subsystem of switching center A during its scanning process and is entered in the processor at switching center A. It will be noted that switching center D also will send back an acknowledge signal to sending switching center A. The purpose of these acknowledge signals is to insure receipt of the proper flood signal by the adjacent switching center, thereby terminating the repetitive propagation of flood signals. Switching center A now awaits a route attempt signal to be described later, which alternately comes from the destination switching center.

Figure 5E:
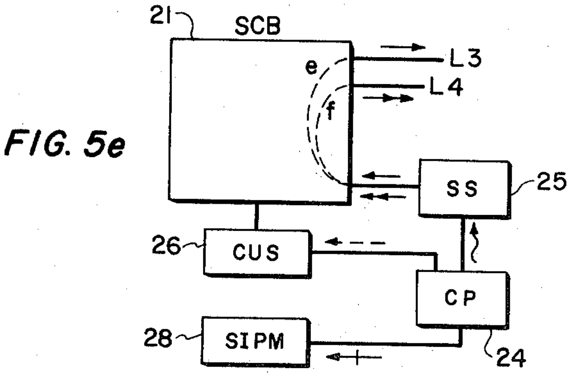

Shortly after propagation of the acknowledge signal over link L1 to switching center A, the processor 24 at switching center B examines the search-in-progress memory, as indicated by the crossed arrow in FIG. 5*e*. If the flood signal was not previously received at switching center A, the processor at switching center B receives an indication of this fact and operates on both the connection updating subsystem 26 (see dashed arrow in FIG. 5*e*) and on the scanning and signalling subsystem 25 (see wavy arrow in FIG. 5*e*) of switching center B to cause the flood signal, indicated by the solid arrow in FIG. 5*e*, to be sent out to switching center C over an out-of-band trunk of line L3 by way of out-of-band connection *e* in the switching matrix and, after a short interval, to switching center E by way of out-of-band connection *f* in the switching matrix and the outgoing link L4, as shown by the double headed arrow. As in the previous example, as soon as the flood signal has been propagated over connections *e* and *f* and the corresponding links L3 and L4, the connections *e* and *f* are broken in sequence, as before, in order to permit use of these connections for other calls, if necessary. The flood signal thus is propagated from switching center B to all adjacent switching centers except the one (switching center A) from which the flood signal was received. The identity of the incoming link over which the flood signal was received is stored in the control unit so that this rule is observed.

As will be explained later, it may be possible in a network arranged differently from that shown in FIG. 1, that a flood signal has already been received by switching center B and entered into its search-in-progress memory prior to arrival of the flood signal from switching center A. Since such a condition will be explained later, in connection with switching center E, one will assume here that no flood signal has previously been entered into switching center B's search-in-progress memory.

A glance at FIG. 1 will indicate that switching center D will be similar to switching center B except that its input is from switching center A of link L2 and its outputs are to switching centers E and G over respective links L5 and L6. Just as flood signals are sent out from switching center B on lines L3 and L4 to switching centers C and E, so also are flood signals sent out substantially simultaneously from switching center D over lines L5 and L6 to switching centers E and G.

Figure 5F:
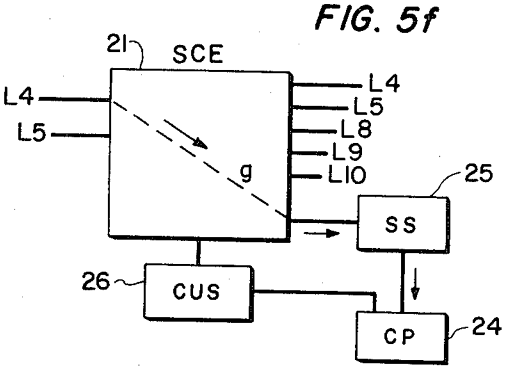

The flood signals propagated from switching centers B and D now appear at switching center E over links L4 and L5. Assuming that the first flood signal to arrive at switching center E is that from switching center B, then the scanning and signalling subsystem of switching center E will detect that flood signal (see arrow in FIG. 5*f*) during the scanning process and a temporary connection *g* is made through the switching matrix of E to its scanning and signalling subsystem. See FIG. 5*f*. In discussing timing, even if one assumes that two or more links entering a given switching center propagate flood signals to that switching center at precisely the same time, one of these flood signals will be processed first since the scanning mechanism of the scanning and signalling subsystem at that switching center can scan only one trunk or channel at a time.

Figure 5G:
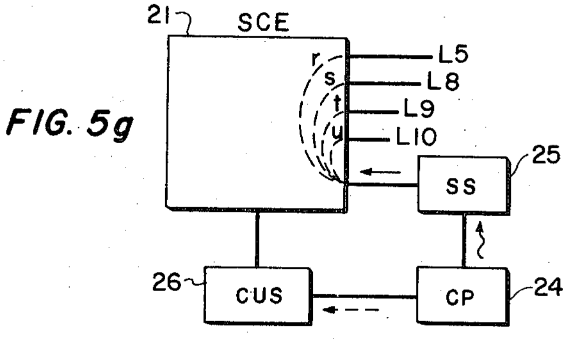

This flood signal from switching center B is stored in the scanning and signalling subsystem 25 of switching center E and also at switching center E's processor 24. A search through the search-in-progress memory 28 is now initiated by the processor at switching center E, just as at previous switching center B, to determine if a previous flood signal for the same call has already been received. Such is not the case. The arrival of this flood signal from switching center B at switching center E then is acknowledged by switching center E by means of an acknowledge signal sent back to switching center B and entered into switching center B's processor. After the acknowledge signal has been propagated by switching center B, the flood signal previously received from switching center B and stored at switching center E is now ordered out of the latter by a command (see wavy arrow in FIG. 5*g*) from the processor 24 at switching center E and the flood signal transmission (see solid arrow in FIG. 5*g*) is achieved sequentially over temporary connections, *r*, *s*, *t* and *u* of the switching matrix 21 of switching center E made by way of connection updating subsystem 26 under the command (see dashed arrow in FIG. 5*g*) and to outgoing switching centers F, H, I and D over trunk groups L8, L9, L10 and L5, all respectively.

Subsequently, a flood signal arrives at switching center E over link L5 from switching center D. This flood signal is picked up by the scanning and signalling subsystem at switching center E and fed to the processor at switching center E. The latter now initiates an examination of the search-in-progress memory of switching center E to determine if a previous flood signal for the same call has already been received at switching center E. Such is the case, viz, the flood signal for the call from the originating switching center to subscriber TN's switching center already has been received at switching center E by way of switching center B. An acknowledge signal is sent back to the sending switching center D and no further action is taken at switching center E since this flood signal was previously received. If, in the previous step, the flood signal for TA–1's call had not been propagated over link L5 but had been stored in the queue of link L5, owing to the prior receipt of an out-of-band flood signal or signals for another call or calls being made at the same time as that of subscriber TA–1, then the flood signal coming from switching center D and entering switching center E would erase this queue storage at E. In other words, the flood signal stored at switching center E is removed from queue storage to relieve the burden on the latter, for there should be no further transmission of the flood signal over the link L5 between the switching centers D and E in either direction. If the flood signal from switching center E to switching center D was not entered at queue at switching center E, but was received by switching center D, then, in a similar manner, no action would be taken in response to this flood signal at switching center D since the latter also has the flood signal in its search-in-progress memory. After switching center E receives an acknowledge signal on all outgoing links L8, L9, L10 and L5 (but not link L4, which is an incoming link), the flood signal entry stored in the search-in-progress memory at switching center E is erased.

The flood signal from switching center E reaching switching center I by way of link L10 is entered into the scanning and signalling subsystem and the processor at switching center I. If one assumes that an examination of the search-in-progress memory at switching center I by the processor reveals no earlier flood signal entry, an acknowledge signal is sent back to switching center E. A flood signal will be transmitted towards switching centers F and H along links L13 and L15, respectively, provided the flood signal from switching center E has reached switching center I before a flood signal can reach switching center I by way of switching centers C and F, E and F, E and H, or G and H. This will be true, since switching centers F and H cannot send out flood signals until they have received flood signals previously from switching centers C or E and E or H, respectively. Although flooding of the entire network is substantially simultaneous, there is a definite flooding order in the network, owing to the very slight processing time required at each switching center to sense an incoming flood signal, examine the appropriate memories and send back an acknowledge signal to the previous switching center. Although this processing time is very short, propagation of flood signals from switching center A to switching center B and switching center D occurs slightly before propagation of flood signals from switching center B to switching center C and from switching center D to switching centers E and G, which, in turn, occurs slightly prior to propagation of flood signals from switching center C to switching center F, switching center E to switching center F, switching center E to switching center H, switching center G to switching center H and switching center E to switching center I. It should be understood, of course, that flood signals may be sent in either direction in the network, subject to the rule that no switching center will send a flood signal back to the switching center from which it has received that flood signal and also to the rule that a flood signal will not be processed at a given switching center if the latter already has received the same flood signal from another switching center.

After propagation of the flood signal from switching center I along links L12, L13, L14 and L15, the processor at switching center I initiates the scanning of the local subscriber memory. Since the called subscriber TN is tied in with switching center I, the address of subscriber TN will already have been entered in the local subscriber memory at switching center I. Scanning of the local subscriber memory by the processor now indicates the presence of the address of TN and a distinctive signal is derived in the processor which initiates a procedure for making an actual message connection (as contrasted with an out-of-band-signalling connection) between the scanning and signalling subsystem of called (destination) switching center I and calling (originating) switching center A. The calling subscriber switching center is identifiable by a portion of the flood signal.

Connections between the various switching centers of the system are made in accordance with a pre-established program set into each of the switching center processors. This routing procedure, which is referred to as real-time routing, is established by an analysis of the complete network of switching centers which may be on a "least cost" basis. For example, one could set up a program in the processor of switching center I such that any call emanating from switching center A would be routed from switching center I to switching center A through switching (enters E and B over links L4 and L1. It is possible that the master controller might want to use a satellite link as the message link between subscribers TA–1 and TN. This can be done by proper instructions placed into the central processed control processor of switching centers A and I the necessary program for commanding interconnection of called subscriber TN at switching center I with one or more satellite trunks along the selected route. By way of example, if the preselected route between switching centers I and A were along links L13, L11, L6 and L2, the trunk selected in link L14 could be a satellite link, the trunk selected on link L13 could be a wire trunk and the trunks selected on links L2 and L5 could be ordinary radio links.

When scanning of the local memory of switching center I reveals that the flood address of the called station has been stored therein (viz, the called subscriber is at switching center I) the control processor at switching center I initiates a real-time routing procedure for interconnecting destination switching center I and originating switching center A. Switching center I knows that it must connect with switching center A since the flood searching message received previously at switching center I during the flooding process contained the address of the originating switching center A.

Each switching center has stored in its control processor a collection of routes of differing degrees of preference which have been compiled previously by suitable network analysis as representing appropriate routes for interconnecting that switching center and any other switching center. For example, switching center I may be programmed to select first a route (primary route) from switching center I to switching center A by way of out-of-band trunks of links L10, L4 and L1, for example. A primary route between switching center I and switching center D might consist of links L12, L8 and L5, and so forth.

Having selected the primary route over which a message route is to be established between the called switching center I and the calling switching center A as constituting link L10 from switching center I to switching center E, link L4 from switching center E to switching center B and finally link L1 from switching center B to switching center A, it is necessary now to determine whether or not this complete primary route actually is available and not tied up with other messages.

The complete pre-established routes, whether they be primary, secondary or any other order of preference, are checked as to availability. This procedure is one form of what is known in the art as end-to-end real time or deterministic routing. Step-by-step deterministic routing also could be used wherein the routing tables are examined at each switching center to attempt to complete a message connection to the next switching center, as opposed to the end-to-end system which examines the route table only at the originating switching center.

Updated information concerning the availability of the various network trunks is supplied to a route availability store in the control processor of each switching center on a real-time basis. This store contains information as to whether or not various trunks are fully occupied with traffic. Since traffic conditions in the network are changing constantly, the stored primary route in the route store from switching center I to switching center A by way of interconnecting switching centers I, E, D and A may be busy at the time that the indication has been received at switching center I that the called subscriber's address has been found in switching center I's local memory.

If this pre-stored primary route is not available, as indicated by a comparison of the contents of the route availability store with the route table store, the processor at switching center I must turn to the pre-established secondary route contained in the route table store for attempting to interconnect switching center I and switching center A. The secondary routes for each combination of trunks linking switching center I and every other switching centers are stored in the processor at switching center I along with the primary routes; access to the stored secondary routes, however, is not permitted until information is received that a primary route is unavailable. As an example, the secondary pre-selected route for interconnecting switching center I and switching center A might consist of trunks L13, L11, L6 and L2.

If an examination of the route availability store at switching center I indicates that this secondary route is unavailable, then the processor at switching center I must examine the tertiary route stored in the route table store, and so on, until an available route has been found. When the route store is exhausted, one must either block the call or generate new routes by use of a computer with an appropriate routing algorithm; if all trunks in the network are busy, the call must be blocked, even with this approach. An all-trunks busy signal then is sent back out of band to the originating switching center A which, in turn, sends this busy signal to the calling subscriber TA–1 at switching center A.

Although the previous check for availability of primary route L10 – L4 – L1 may have been positive, there may be occasions when the traffic conditions over this route may change rapidly while the message connections between switching centers I, E, B and A are being established. For example, a call may be in process by a subscriber, say at switching center F to switching center B over the last free trunk of the trunk group L4 between switching centers F and B over which the call from subscriber TN to subscriber TA–1 is to be made (that is, the same trunk which is to form part of the selected path for TN's call to switching center A) before the actual routing of TN's call to TA–1 can be completed. Normally, of course, the indication of non-availability of trunks will be registered in the route availability store until all channels of that trunk have become busy. This situation requires use of route attempt signals and associated trunk available signals, which now will be described.

If the complete primary route between the destination and originating switching centers is available at the time information is generated at switching center I indicating the presence of the called subscribers address in the local memory at switching center I, a call attempt signal is propagated from the destination switching center I. The call attempt signal contains a tag (such as a group of digits) peculiarly identifying the signal as a route attempt signal, as well as the address of the originating switching center A and a code identifying the complete primary route, viz, the network links L10, L4 and L1, in this case, over which the call should proceed between switching centers I and A. The route attempt signal from switching center I is propagated to switching center E along an out-of-band trunk of link L10.

Upon propagation of the route attempt signal from switching center I, the processor of the latter instructs the connection updating system of switching center I to reserve a message connection along link L12. If switching center E were the originating switching center, it would send back to switching center I a route available signal to make the necessary message connections between switching center E and switching center I. Since, in the example given, switching center E is not the originating switching center, the processor at switching center E checks to determine if the appropriate outgoing message trunk therefrom is available. The information as to the outgoing trunk of link L4 which has been pre-selected as part of the primary route is contained in the route attempt signal received by switching center E from the destination or called switching center I. If the pre-selected outgoing trunk of link L4 has a channel available, as determined by switching center E, the processor at switching center E allocates one of the idle message channels of link L4 for use and propagates the route attempt signal along an out-of-band trunk of the outgoing link L4 leading from switching center E to switching center B. At the same time, switching center E reserves a message connection along link L4 to switching center B and along L12 to switching center E. The process described above is now repeated at switching center B. Since, in the example assumed, switching center B is not the originating switching center, a check is made at switching center B as to whether or not a message channel in the already pre-selected link L1 between switching center B and switching center A is available. If so, the message channel of link L1 is reserved and a route attempt signal is sent over the out-of-band channel of link L1 to switching center A.

When the route attempt signal reaches the originating switching center A, the control processor at switching center A sends out of band to switching center B (the switching center from which it acquired its route attempt signal) a route available signal. Now the reserved message link L1 is connected at the switching matrix at switching center B and the route available signal continues out of band along the already available link L4 to switching center E and available link L10 to switching center I. As the route available signal reaches each given switching center, it completes the message connection at that switching center so that a complete message path or route is now formed between the destination switching center and the originating switching center. It remains only for the switching centers A and I to make the necessary local matrix connections to their respective subscribers TA–1 and TN. A busy test is made at switching center I of subscriber TN and, if subscriber TN is not busy with another call, then switching center I sends the address of TN to switching center A so that switching center A can identify this address with subscriber TA–1 and make connection of subscriber TA–1 to the established route. A ring-back signal is forwarded back along the completely connected route to switching center A to the calling subscriber TA–1 over the local connection reserved at the time that TA–1 originated the call by dialing TN's address.

The superiority of designating switching center A rather than the calling subscriber TN in the flood signal is now evident. If the flood signal contained only the address of the calling subscriber TA–1, the destination switching center I could not make up a route back to TA–1 inasmuch as switching center I could not know where in the network subscriber TA–1 was. Furthermore, network routes are designated by switching centers, so that information as to the originating switching center is much more vital for real-time routing purposes than information as to the calling party.

In regard to the allocation of message links and the completion of connections at the switching centers in response to receipt of route available signals, there are two general methods of approach. The message trunk, such as one of the trunks of line L10, can be reserved in the switching center I in a special temporary register and, if a route blocked signal returns, the entry is erased or, if a route available signal returns, the message connection can be actually made for the switching center matrix to connect up the paths. Alternately, one can make the necessary message connections at the time the route attempt signals are propagated, subject to being disconnected upon receipt back of a route blocked signal. Similar to the case of the first approach, means should be provided, when using the second approach, so that, at the end of some pre-established timeout period, the connection previously made is disconnected.

So far, the assumption has been made in the example that outgoing trunks were available to establish the preselected primary route from destination switching center I to originating switching center A by way of links L10, L4 and L1. If, however, the previous decision at switching center I that the primary route was available suddenly becomes no longer valid because of increased traffic load, a route blocked condition is indicated at the processor of the switching center to which the blocked trunk is connected. Suppose that, at the time the route attempt signal from switching center I reaches switching center E, all of the trunks, comprising link L4, constituting the primary route suddenly becomes busy or otherwise unavailable for message traffic. The presence of this blocked condition results in the route blocked signal being generated at switching center E in response to the arrival of the route attempt signal from switching center I. Receipt by switching center I of this route blocked signal over the out-of-band channel of link L10 initiates a re-examination of the route availability store and the route table store to select an alternate route, in accordance with the procedure already mentioned.

A time-out signal is initiated at the time that the originating switching center A sends out the flood signal. The duration of this time-out signal is made somewhat longer than the time required to completely flood the entire system and search all memories. If a route attempt signal is received at the originating switching center A before termination of the time-out signal, the time-out signal is thereby terminated. If, on the other hand, at the end of the time-out interval, the route attempt signal has not been received at switching center A, the time-out signal terminates and processing of the call is discontinued. A distinctive signal is sent to the calling subscriber TA–1.

Obviously many other modifications and variations of the present invention are possible in the light of the above teachings. It is therefore to be understood that within the scope of the appended claims, the invention may be practiced otherwise then as specifically described.

What is claimed is:

1. A routing procedure for a switching network having a plurality of switching centers each having a local subscriber memory and a search memory, adjoining ones of said switching centers being interconnected by communication links each consisting of at least one signalling channel and several message channels wherein a calling subscriber at an originating switching center is connected to a called subscriber at a destination switching center whose location in the network need not be known to said calling subscriber comprising the steps of;

producing at said originating switching center in response to initiation of the calling subscriber's call containing the directory address of the called subscriber a flood signal of minimal format containing the aforesaid address of the called subscriber, the address of the originating switching center and the time of initiation of the calling subscriber's call;

propagating said flood signal over said signalling channel from said originating switching center simultaneously to all switching centers in the network adjoining said originating switching center;

propagating substantially simultaneously over said signalling channel only the flood signal initially received at said other switching centers to all network switching centers adjoining each said other switching center except the switching center from which said flood signal has just been received; and examining a search memory at each of the switching centers other than the originating switching center receiving said flood signal for a previous receipt thereof.

2. A routing procedure for a switching network according to claim 1 further including the step of entering the flood signal propagated from each said other switching center into the search memory thereof.

3. A routing procedure for a switching network according to claim 1 further including the step of sending an acknowledge signal from each said other switching center to the switching center responsible for the received flood signal.

4. A routing procedure for a switching network according to claim 2 further including the steps of providing a timing signal at each switching center upon propagating said flood signal therefrom, said timing signal being of duration exceeding the combined time required for transmission of said flood signal and said acknowledge signal over the network link having the longest delay; and discontinuing processing of said call at said switching center if an acknowledge signal is not received at that switching center prior to termination of said timing signal.

5. A routing procedure for a switching network according to claim 3 further including the steps of entering the flood signal propagated from each said other switching center into the search memory thereof; and erasing the flood signal entered into the search memory at each said other switching center in response to the receipt of acknowledge signals from all switching centers adjoining the corresponding switching center.

6. A routing procedure for a switching network according to claim 2 further including the steps of examining substantially simultaneously the local subscriber memory at each of said other switching centers after entry of said flood signal into the corresponding search memory thereof to determine whether said switching center is the destination switching center.

7. A routing procedure for a switching network according to claim 6 further including the step of establishing a route between the destination switching center and said originating switching center along message channels of a preselected combination of links.

8. A routing procedure for a switching network according to claim 1 further including the step of discontinuing processing of a flood signal received at a given one of said other switching centers when the examination of said search memory reveals a previous receipt of said flood signal.

9. A routing procedure for a switching network according to claim 2 further including the step of queueing at each said other switching center the flood signals for different subscriber calls arriving at that other switching center.

10. A routing procedure for a switching network according to claim 8 further including the step of queueing at each of said other switching centers the flood signals for different subscriber calls arriving at that other switching center.

11. A routing procedure for a switching network according to claim 9 further including the step of erasing the queue entry of the flood signal for the calling subscriber's call at a given one of said other switching centers when examination of the search memory reveals previous receipt of the same flood signal.

12. A routing procedure for a switching network according to claim 10 further including the step of erasing the queue entry of the flood signal for the calling subscriber's call at a given one of said other switching centers when examination of the search memory reveals previous receipt of the same flood signal.

13. A routing procedure for a switching network according to claim 6 further including the steps of sending a route attempt signal for said destination switching center over a signalling channel to an adjoining switching center which is along the route preselected for interconnecting said destination switching center and said originating switching center upon receipt of said flood signal at said destination switching center; and forwarding said route attempts signal along signalling channels to other switching centers along said preselected route in the absence of a route blocked condition.

14. A routing procedure for a switching network according to claim 13 including the steps of initiating a time-out signal at said originating switching center at the time of flood signal propagation therefrom and of duration determined by the time normally required for complete flooding of the entire switching network; and discontinuing call processing at said originating switching center if a route attempt signal is not received at said originating switching center before termination of said time-out signal.

15. A routing procedure for a switching network according to claim 14 further including the step of sending from said originating switching center a distinctive signal to said called subscriber in response to discontinuance of said call processing.

16. A routing procedure for a switching network according to claim 13 further including the step of allocating a message channel in said link between a given said other switching center and the switching center adjoining thereto along said preselected route as said route attempt signal is sent out of the given switching center.

17. A routing procedure for a switching network according to claim 16 further including the step of propagating a route available signal from said originating switching center upon receipt thereby of said route attempt signal.

18. A routing procedure for a switching network according to claim 17 further including the steps of generating a timing signal of predetermined duration at said destination switching center at the time of sending out the route attempt signal therefrom; and discontinuing processing of the call at the destination switching center if an acknowledge signal is not received by said destination switching center from the originating switching center within said predetermined time.

19. A routing procedure for a switching network according to claim 16 further including the step of propagating a busy signal from the destination switching center to said calling subscriber at said originating switching center if the called subscriber is busy with another call.

20. A routing procedure for a switching network according to claim 16 further including the step of completing the message connection already allocated at each switching center along the preselected route during the route attempt procedure to establish a useable message connection between the called and calling subscribers.

21. A procedure for locating a called party in a switching network having a plurality of interconnected switching centers, adjoining ones of which are joined by links each consisting of at least one signalling channel and several message channels, said network having an originating switching center to which a calling subscriber is connected and a destination switching center at a location in the network which need not be known to the calling subscriber comprising;

propagating substantially simultaneously throughout said network only along one of said signalling channels of the links interconnecting all switching centers of said network a flood signal containing information indicative of the called party, the originating switching center and the time of initiation of the calling subscriber's call.

22. A routing procedure for a switching network according to claim 21 further including the steps of, examining a local subscriber memory at each switching center to determine if said switching center is the destination switching center;

sending a route attempt signal from said destination switching center over a signalling channel to an adjoining switching center which is along a route preselected for interconnecting said destination switching center and said originating switching center upon receipt of said flood signal at said destination switching center; and forwarding said route attempt signal along signalling channels to intermediate switching centers along said preselected route in the absence of a route blocked condition.

23. A routing procedure for a switching network according to claim 22 further including the step of, allocating a message channel in said link between a given switching center and the adjacent switching center along said preselected route as said route attempt signal is sent from said switching center.

24. A routing procedure for a switching network according to claim 23 further including the steps of, propagating a route available signal from said originating switching center upon receipt of said route attempt signal; and completing the message connection already selected at each switching center along the preselected route during the route attempt procedure to establish a complete message connection between the calling and called subscribers.

25. A routing procedure for a switching network having a plurality of switching centers wherein a calling subscriber at an originating switching center is connected to a called subscriber at a destination switching center whose location in the network is unknown to said calling subscriber comprising;

entering into a search memory of limited capacity at said originating switching center the directory address of the called subscriber;

examining a local subscriber memory at said originating switching center to determine if said directory address is contained therein;

examining the search memory at said originating switching center, if the local subscriber memory does not contain said directory address, for the existence therein of the same directory address owing to a prior call from another calling subscriber at said originating switching center to the same called subscriber;

making up a complete flood signal of minimal format at said originating switching center if no evidence of a prior call to the same called subscriber is found during the search memory examination, said flood signal containing information indicative of the originating switching center and the time of initiation of the calling subscriber's call, as well as said directory address of the called subscriber;

propagating said flood signal out of band from said originating switching center simultaneously to all adjacent switching centers in the network;

examining the search memory of each of the switching centers other than the originating switching center receptive of said flood signal fro a previous receipt thereof;

propagating out of band only the flood signal initially received at all of said other switching centers simultaneously to all adjoining network switching centers except the one from which said flood signal has just been received;

entering the flood signal propagated from each said other switching center into the corresponding search memory thereof;

examining the local subscriber memory of each switching center after entry of said flood signal into said corresponding search memory to determine if said switching center is the destination switching center; and establishing a preselected message route between the destination switching center and said originating switching center.

26. A routing procedure according to claim 22 further including the steps of determining from current information in said network whether a preselected route is available between said destination switching center and said originating switching center before sending said route attempt signal;

generating a route blocked signal at an intermediate switching center in response to receipt of said route attempt signal from the adjoining switching center indicating availability of said route when a condition subsequently occurs that all links along said route become blocked; propagating said route blocked signal along the preselected route over which the route attempt signal was sent;

selecting another route of next lower preference in response to propagation of said route blocked signal; and repeating the aforesaid route attempt process and alternate route selection process until a route has been found along which no links are blocked.

27. A routing procedure for a switching network having a plurality of switching centers, adjoining ones of which are interconnected by communication links, wherein a calling subscriber at an originating switching center is connected to a called subscriber at a destination switching center whose location need not be known to said calling subscriber, including the steps of, entering into a search memory at said originating switching center a directory address of the called subscriber;

searching a local subscriber memory at the originating switching center to determine whether said called subscriber is at said originating switching center;

examining said search memory if the search of said local subscriber memory is negative to determine whether another calling subscriber at said originating switching center has already called the same called subscriber;

generating a flood signal at said originating switching center which includes said directory address of the called subscriber, information designating the originating switching center and information designating the time of initiation of the calling subscriber's call; and propagating said generated flood signal along links interconnecting said originating switching center and adjoining switching centers.

28. A routing procedure for a switching network according to claim 27 further including the step of sending a busy signal to said calling subscriber when the examination of said memory indicates initiation of a prior call to the same called subscriber by another calling subscriber at the originating switching center.

* * * * *